United States Patent [19]

Jimenez

[11] Patent Number: 4,587,800
[45] Date of Patent: May 13, 1986

[54] GRASS TRIMMING AND EDGING DEVICE

[76] Inventor: Raul Jimenez, 5308 Jerri La., Fort Worth, Tex. 76117

[21] Appl. No.: 702,902

[22] Filed: Feb. 19, 1985

Related U.S. Application Data

[63] Continuation of Ser. No. 600,441, Apr. 16, 1984, abandoned.

[51] Int. Cl.⁴ .......................... A01G 3/06; A01D 53/00
[52] U.S. Cl. ...................... 56/16.9; 56/16.7; 56/17.2
[58] Field of Search .............. 56/237, 16.7, 16.9, 56/256, 17.5

[56] References Cited

U.S. PATENT DOCUMENTS

| | | | |
|---|---|---|---|
| 322,193 | 7/1885 | McLaughlin | 56/237 |
| 2,608,043 | 8/1952 | Berdan | 56/17.2 |
| 2,734,325 | 2/1956 | LaBonte | 56/16.9 |
| 2,796,715 | 6/1957 | Meltzer | 56/17.2 |
| 2,867,960 | 1/1959 | Stiles et al. | 56/17.2 |
| 2,938,323 | 5/1960 | Livingston et al. | 56/16.9 |
| 3,019,844 | 2/1962 | Kay | 56/256 |
| 3,221,481 | 12/1965 | Mattson et al. | 56/16.9 |
| 3,857,515 | 12/1974 | Zennie | 56/16.8 |
| 4,170,099 | 10/1979 | Owens | 56/16.7 |
| 4,182,100 | 1/1980 | Letter | 56/16.7 |
| 4,389,836 | 6/1983 | Lowry et al. | 56/16.9 |
| 4,442,659 | 4/1984 | Enbusk | 56/256 |

Primary Examiner—Paul J. Hirsch
Attorney, Agent, or Firm—Kanz, Scherback & Timmons

[57] ABSTRACT

A trimming and edging device for grass, weeds and the like having a motor within a housing (12) supported by a support member (22) in a first position in which a cutting element (14) sweeps in a substantially horizontal plane and in a second position in which the cutting element sweeps in a substantially vertical plane to the side of a carriage (16) for the device is disclosed. In one arrangement, the support member rotates in a horizontal plane about a bolt and wing nut (20), and the motor housing rotates in a substantially vertical plane about a bolt and wing nuts (24).

1 Claim, 2 Drawing Figures

GRASS TRIMMING AND EDGING DEVICE

This application is a continuation of application Ser. No. 600,441, filed Apr. 16, 1984, now abandoned.

DESCRIPTION

1. Technical Field

The present invention relates generally to devices for trimming grass, weeds and the like and, in one of its aspects, to a device which is convertible between a conventional trimming device and an edger.

Devices for trimming grass, weeds and the like with a rapidly rotating cable of nylon or similar material have been used for some years now. Such devices are used for trimming in places that cannot be usually reached with a lawn mower and in many situations replace hand clippers.

2. Background Art

A carriage for a rotary trimming device which allows connversion of the device to an edger is shown in U.S. Pat. No. 4,287,709 and U.S. Pat. No. 4,343,139 of Lowry et al. These carriages show the use of a fifth wheel for tipping the carriage and the attached trimming device at an angle to aid in certain edging type operations.

A different approach to such carriages is shown in U.S. Pat. No. 4,182,100 of Letter. Letter shows the use of a wheeled tricycle type frame made up of tubing. The Letter patent also shows a more flexible way of guiding the trimmer with the use of support springs along with the handlebars to hold the trimming cable out from the carriage. In the device of Lowry et al, the entire support frame of the carriage must be tilted, creating an unstable arrangement. The edging itself is done at an angle. Using the device shown in Letter for edging would require holding the device itself along with its steering handlebars at the angle necessary for edging which would be uncomfortable and tiresome.

DISCLOSURE OF INVENTION

In accordance with the present invention, a trimming device includes a motor, a housing for the motor and a cutting element connected to the motor in a conventional fashion. The device also inlcudes a carriage and means for mounting the motor housing on the carriage. The means for mounting allows the motor to be mounted in at least two positions. In a first position, the axis of rotation of the cutting element is substantially vertical so that the cutting element swings in a substantially horizontal plane. In a second position, the axis of rotation for the cutting element is substantially horizontal so that the cutting element sweeps in a substantially vertical plane. In one arrangement, the mounting means includes a vertical axis pivot means, a support member rotatable with respect to the carriage in a substantially horizontal plane about the vertical axis pivot means and a horizontal axis pivot means spaced apart from the vertical axis pivot means. The motor housing is rotatable about the horizontal means with respect to the support member.

In a preferred form, the support member supports the housing in front of the carriage in the first position and supports the housing to the side of the carriage when in the second position.

The trimming device of the present invention operates as a conventional trimming device when the motor is supported in the first position and as a conventional edger when the motor is supported in the second position without the need for tipping the entire carriage or holding the device at an odd angle. The user can operate the device from a normal and comfortable upright position as a trimmer or an edger.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
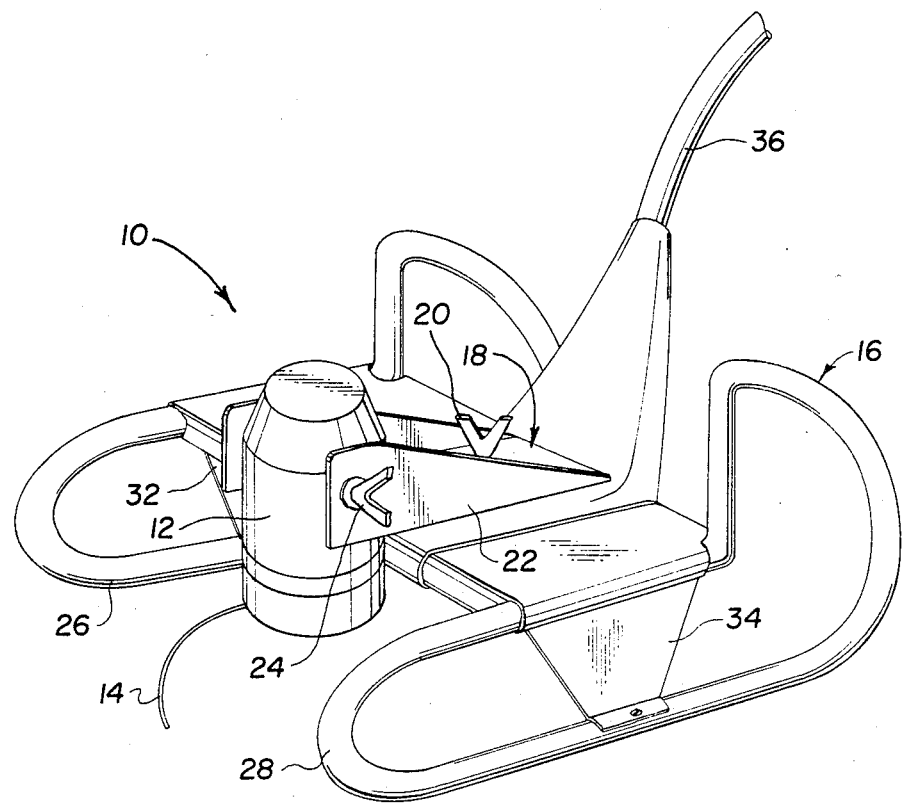
FIG. 1 is a perspective view of a preferred form of a trimming device according to the present invention in position to operate as a conventional trimming device.

Referring now to the drawing, and in particular to FIG. 1, a trimming device according to the present invention is referred to generally by reference numeral 10. Trimming device 10 includes a motor of a conventional sort which is not shown but is enclosed within housing 12 for the motor. A cutting element 14 made of nylon or similar material is connected to the motor so as to be rotatable about an axis for cutting grass, weeds and the like. A carriage 16 supports cutting device 10, and means 18 for mounting motor housing 12 on carriage 16 supports motor housing 12 in a first position in which axis of rotation of cutting element 14 is substantially vertical. As a result, cutting element 14 swings in a substantially horizontal plane in the manner of a conventional trimming device. Means 18 for mounting motor housing 12 on carriage 16 includes a vertical axis pivot means such as bolt and wing nut 20 and support member 22 which is rotatable with respect to the carriage in a substantially horizontal plane about bolt and wing nut 20. A horizontal pivot means such as bolt and wing nuts 24 is spaced apart from bolt and wing nut 20. Motor housing 12 is rotatable about bolt and wing nuts 24 in a substantially vertical plane.

Figure 2:
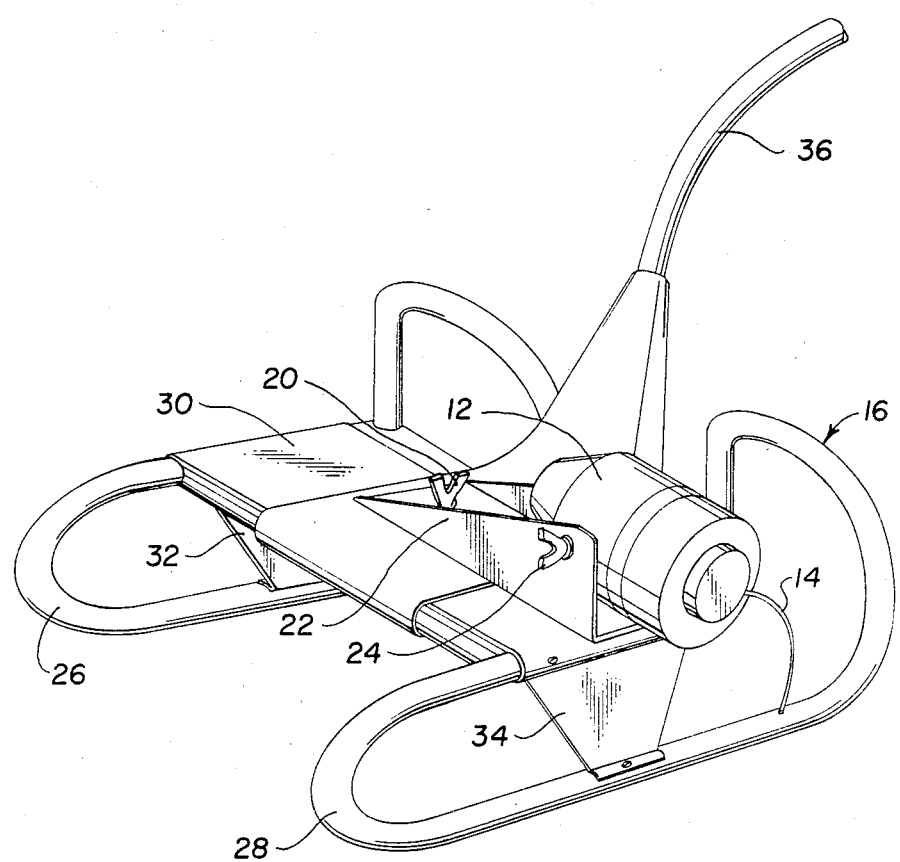
FIG. 2 is a perspective view of the trimming device of FIG. 1 with the motor in position to operate as an edger.

Referring now to FIG. 2, motor housing 12 is in a second position in which support member 22 supports it to the side of carriage 16 and in which the axis of rotation for cutting element 14 is substantially horizontal so that cutting element 14 swings in a substantially vertical plane. The second position was achieved by first rotating motor housing 12 about bolt and wing nuts 24 from a substantially vertical position to a substantially horizontal position, then re-tightening the wing nuts to hold it in place. Support member 22 was then rotated in a substantially horizontal plane about bolt and wing nut 20 until motor housing 12 was to the side of carriage 16. Then the wing nut was re-tightened.

Carriage 16 shown for illustration purposes is a sled type carriage having runners 26 and 28 connected by a support platform 30. Runners 26 and 28 are preferably constructed from a light tubing and are reinforced by webbing 32 and 34. A handle 36 is provided for the convenience of the user in pushing and guiding the trimming device. Carriage 16 shown for purposes of illustration is also described in co-pending application Ser. No. 551,126, filed Nov. 14, 1983, but a conventional carriage such as a wheeled carriage could also be used.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawing is to be interpreted as illustrative and not in a limiting sense.

I claim:

1. A trimming device comprising in combination:
   a motor;
   a housing for the motor;
   a cutting element connected to the motor so as to be rotatable about an axis for cutting grass, weeds and the like;
   a carriage;
   a vertical axis pivot means;
   a support member rotatable with respect to the carriage in a substantially horizontal plane about the vertical axis pivot means; and
   a horizontal axis pivot means affixed to the support member, spaced apart from the vertical axis pivot means wherein the motor housing is rotatable about the horizontal pivot means with respect to the support member;
   wherein the motor can be supported in both a first position in which the axis of rotation of the cutting element is substantially vertical and a second position in which the axis of rotation for the cutting element is substantially horizontal.

* * * * *